(12) United States Patent
Bell et al.

(10) Patent No.: US 8,943,898 B2
(45) Date of Patent: Feb. 3, 2015

(54) DISPLAY BENDER AND METHOD OF TESTING FLEXIBLE DISPLAY

(75) Inventors: Cynthia Bell, Chandler, AZ (US); Terry L. Alford, Phoenix, AZ (US); Roy Stephen Rednour, Chandler, AZ (US); Mark Richards, Chandler, AZ (US)

(73) Assignee: Arizona Board of Regents, a body corporate of the State Arizona, Acting for and on behalf of Arizona State University, Scottsdale, AZ (US)

( * ) Notice: Subject to any disclaimer, the term of this patent is extended or adjusted under 35 U.S.C. 154(b) by 306 days.

(21) Appl. No.: 13/305,344

(22) Filed: Nov. 28, 2011

(65) Prior Publication Data

US 2012/0067134 A1    Mar. 22, 2012

Related U.S. Application Data

(63) Continuation of application No. PCT/US2010/036453, filed on May 27, 2010.

(60) Provisional application No. 61/182,681, filed on May 29, 2009.

(51) Int. Cl.
*G01N 3/02* (2006.01)
*G02F 1/1333* (2006.01)
*G02F 1/13* (2006.01)

(52) U.S. Cl.
CPC ........ *G02F 1/133305* (2013.01); *G02F 1/1309* (2013.01)
USPC .......................................................... 73/856

(58) Field of Classification Search
CPC ........................ G02F 1/133305; G02F 1/1309
See application file for complete search history.

(56) References Cited

U.S. PATENT DOCUMENTS

| 6,232,616 B1* | 5/2001 | Chen et al. ............... 250/559.45 |
| 2010/0206062 A1* | 8/2010 | Yoon et al. ................. 73/150 A |

FOREIGN PATENT DOCUMENTS

| JP | 10-132705 | 5/1998 |
| KR | 10-2005-0055883 | 6/2005 |
| KR | 10-2008-0015240 | 2/2008 |

OTHER PUBLICATIONS

ISR and Written Opinion from corresponding PCT Application No. PCT/US10/036453 dated Dec. 21, 2010.

* cited by examiner

*Primary Examiner* — Lisa Caputo
*Assistant Examiner* — Brandi N Hopkins
(74) *Attorney, Agent, or Firm* — Bryan Cave LLP

(57) ABSTRACT

Some embodiments include an apparatus for testing flexible displays. The apparatus can include: (a) a first clamp configured to receive a first end of the flexible display; (b) a second clamp configured to receive a second end of the flexible display, wherein the second end of the flexible display is opposite the first end of the flexible display; and (c) a test column. Other embodiments and methods are disclosed herein.

20 Claims, 7 Drawing Sheets

DISPLAY BENDER AND METHOD OF TESTING FLEXIBLE DISPLAY

CLAIM OF PRIORITY

This application is a continuation of PCT Application No. PCT/US2010/036453, filed May 27, 2010, which claims the benefit of U.S. Provisional Patent Application No. 61/182,681, filed May 29, 2009. PCT Application No. PCT/US2010/036453 and U.S. Provisional Patent Application No. 61/182,681 are incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license to others on reasonable terms as provided by the terms of Grant/Contract No. W911NF-04-2-0005 by the Army Research Lab (ARL).

FIELD OF THE INVENTION

The invention relates generally to display testers, and relates more particularly to flexible display testers and the methods of testing flexible displays.

BACKGROUND OF THE INVENTION

Flexible displays are becoming more popular as a replacement for traditional glass panel displays. Glass-based displays are much more fragile than flexible displays, and glass-based displays must be ruggedized for use in mobile applications. In addition, glass-based displays also restrict the form factor of products that incorporate such displays. Glass-based displays create a hard, flat surface that does not conform well to non-rectangular product housings. Thus, flexible displays can be used for a wider variety of applications. Given the increase of flexible displays, devices must be developed to test their functionality. One measure of the functionality of a flexible display is its bendability.

BRIEF DESCRIPTION OF THE DRAWINGS

To facilitate further description of the embodiments, the following drawings are provided in which.

Figure 1:
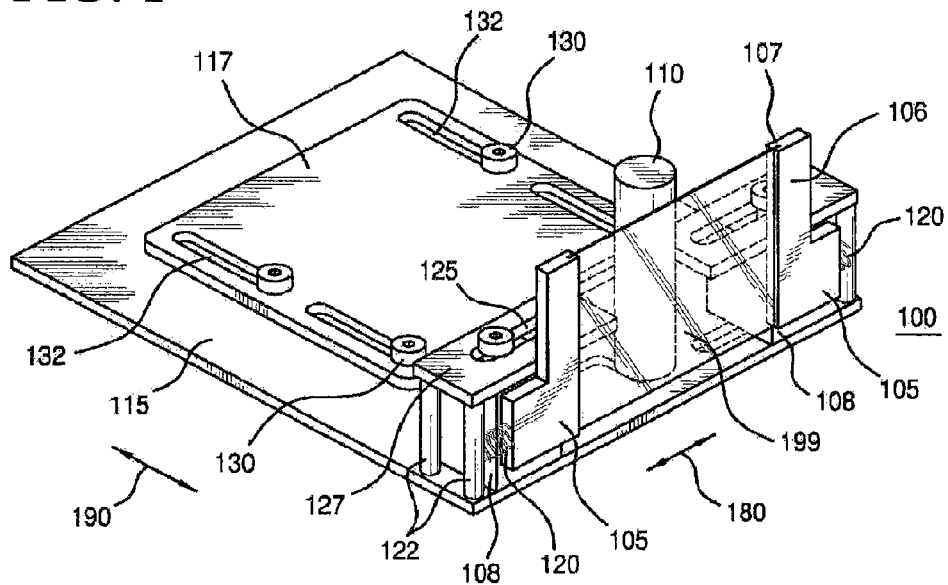
FIG. 1 illustrates an isometric view of an example of a display bender apparatus in an original position, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

An electrical "coupling" and the like should be broadly understood and include coupling involving any electrical signal, whether a power signal, a data signal, and/or other types or combinations of electrical signals. A mechanical "coupling" and the like should be broadly understood and include mechanical coupling of all types. The absence of the word "removably," "removable," and the like near the word "coupled," and the like does not mean that the coupling, etc. in question is or is not removable.

DETAILED DESCRIPTION

A device that tests flexible displays should be affordable, allow the display face to be visible to allow imaging of the display during testing, and provide adequate boundary conditions to detect and analyze defects and conduct material science modeling.

An apparatus for testing a flexible display can include: (a) a first clamp configured to receive a first end of the flexible display; (b) a second clamp configured to receive a second end of the flexible display, wherein the second end of the flexible display is opposite the first end of the flexible display; and (c) a test column.

In another embodiment, an apparatus for testing a flexible display can include: (a) a test column coupled to a translating stage; (b) a base coupled to the translating stage, wherein the translating stage is capable of moving back and forth relative to the base; (c) a first clamp capable of rotating about a first axis; and (d) a second clamp capable of rotating about a second axis; wherein the first clamp is configured to receive a first end of the flexible display, the second clamp is configured to receive a second end of the flexible display, and the second end of the flexible display is opposite the first end of the flexible display.

Other embodiments include a method of testing a flexible display. The method can include: (a) providing a flexible display; (b) coupling a first end of the flexible display to a first clamp; (c) coupling a second end of the flexible display to a second clamp; and (d) pushing a first surface of the flexible display with a test column.

Turning to the drawings, FIG. 1 illustrates an isometric view of an example of a display bender apparatus 100 according to a first embodiment of the present invention. Display bender apparatus 100 is configured to test flexible display 199. Apparatus 100 is merely exemplary and is not limited to the embodiments presented herein. Apparatus 100 can be employed in many different embodiments or examples not specifically depicted or described herein.

Display bender apparatus can include a pair of clamps 105 that are configured to couple with flexible display 199. One clamp 105 is coupled to one end of flexible display 199 while the other clamp 105 is coupled to the other end or opposite end of flexible display 199. Clamps 105 can each comprise a front portion 106 and a rear portion 107. Front portion 106 and rear portion 107 are configured to hold an end of flexible display 199 between the two portions. Any technique can be used to hold front portion 106 and rear portion 107 together. For example, screws can be used to hold front portion 106 and rear portion 107 together with flexible display 199 held securely in place between the two portions. In another example, a clamp can be used to similarly hold front portion 106 and rear portion 107 together with flexible display 199 between the two portions. In one embodiment, clamps 105 can comprise plastic. In the same or different embodiment, front portion 106 and rear portion 107 comprise rubber grips, which can help clamps 105 to secure flexible display 199.

In addition, clamps 105 can support one or more electrical connections to flexible display 199. These electrical connections can be used to support various methods of detecting failure of flexible display 199. For example, the electrical connections can measure a resistance of conductor lines integral with flexible display 199, or a resistance of a thin graphite layer external to flexible display 199 but applied to the surface of flexible display 199. In the same or different examples, the electrical connections can enable flexible display 199 to be operational during the testing for active display image performance analysis.

In some embodiments, clamps 105 are coupled to pivots 108. In one example, clamps 105 are coupled to pivots 108 by way of screws. Pivots 108 are configured to rotate about an axis at their centers of rotation. In some examples, the axes about which pivots 108 rotate can be substantially parallel to each other. In the same or different examples, the axes about which pivots 108 rotate can be substantially perpendicular to base 115. In one example, pivots 108 have a shape of a substantially rectangular prism, but pivots 108 can comprise many other shapes.

When a force is applied to flexible display 199, clamps 105 are able to rotate in the direction of the force applied to a surface of flexible display 199 because pivots 108 are able to rotate. If clamps 105 were not allowed to rotate, a stress condition would develop along the edge of clamps 105, and flexible display 199 would take on a complex bend curve. In other words, flexible display 199 would have a bend in the display outside of clamps 105. In some embodiments, the axes about which pivots 108 rotate lie within a plane of flexible display 199 when flexible display is attached to clamps 105 and no force is a surface of flexible display 199.

In some embodiments, apparatus 100 does not include pivots. Clamps 105 can be configured to move along x-axis 180 and y-axis 190 force is applied to a surface of flexible display 199. For example, clamps 105 can be coupled to supports, such as for example, support ridges 122 in a way that allows clamps 105 to move along x-axis 180 and y-axis 190.

In addition, apparatus 100 also comprises pivot slots 125. Pivots slots are located within top walls 127. Pivots 108 are coupled to apparatus 100 at pivots slots 125. Pivots slots 125 allow pivots 108, and therefore clamps 105, to slide (i.e., move along x-axis 180) as force is applied to flexible display 199. For example, as force is applied to a center of flexible display 199, the center of flexible display 199 will move in a direction along a y-axis 190. Then, clamps 105, which are coupled to pivots 108, will move in the x-direction towards the center of apparatus 100. Other portions of apparatus 100 that are shown in FIG. 1 are explained below.

Figure 2:
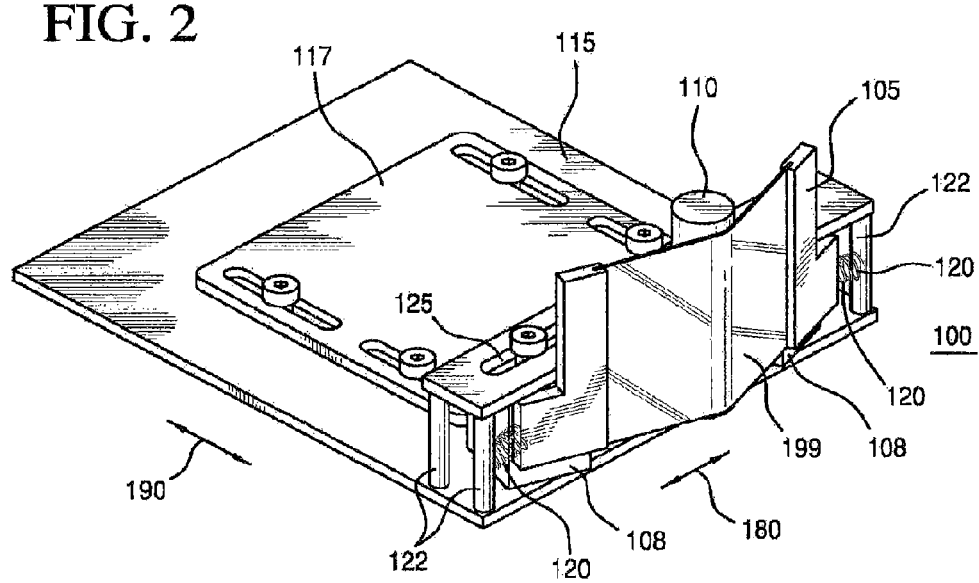
FIG. 2 illustrates an isometric view of an example of the display bender apparatus of FIG. 1 in a pushed position, according to the first embodiment.

FIG. 2 illustrates an isometric view of an example of apparatus 100 when force is being applied to flexible display 199. As can be seen, the center of flexible display 199 is forced in a direction along y-axis 190. Clamps 105 are rotated about pivots 108. In addition, clamps 105, which are holding the opposite edges of flexible display 199, move in a direction along x-axis 180.

Top walls 127 can be coupled to base 115 via rigid supports 122. As an example, top walls 127 can be coupled to rigid supports 122 with screws. In addition, rigid supports 122 can be coupled to base 115 with screws. In other examples, rigid supports can be coupled to top walls 127 and/or base 115 with fastening devices other than screws.

Apparatus 100 also comprises test column 110. Test column 110 can comprise any material that will not unduly harm flexible display 199 when test column 110 is pressed against flexible display 199. For example, test column 110 can comprise plastic.

Test column 110 can comprise any shape that imparts a known radius against flexible display 199, when test column 110 is pressed against flexible display 199. As an example, as can be seen in FIGS. 1 and 2, test column 110 can have a right angle cylinder shape with a predetermined radius. Thus, when test column 110 is pressed against flexible display 199, as seen in FIG. 2, a bend is formed in flexible display 199, having the characteristics of test column 110 (i.e., a radius). In other examples, test column 110 can comprise a column with a front end that is shaped in a semicircle, such as, for example, half of a right angle cylinder. In some embodiments, test column 110 can be removable, allowing different sizes and shapes of test columns to be used.

Returning to FIG. 2, apparatus 100 can also comprise springs 120. One end of springs 120 can be coupled to rigid supports 122. The other end of springs 120 can be coupled to a portion of clamps 105. Springs 120 provide spring tension on flexible display 199, when flexible display 199 is positioned in clamps 105. Springs 120 help return flexible display 199 to a non-bent or planar position after no longer being pushed or flexed by test column 110. In addition, the combination of clamps 105 and springs 120 help remove any residual bow that may be present in flexible display 199 after being bent by test column 110. Furthermore, the combination of clamps 105 and springs 120 help constrain the bend radius of flexible display 199, thus allowing well defined displacements in the x, y, z, and theta directions. The well defined displacements can be readily incorporated into mechanical models of materials deformation. As previously mentioned, in some embodiments, there are no pivots 108 present and coupled to clamps 105; instead clamps 105 can be coupled to rigid supports 122 via springs 120.

In some embodiments, there are no springs present. Instead, there may be motors that move clamps 105 and pivots 108 within pivot slots 125 along x-axis 180. Such a design would introduce another variable that can be tested when test column 110 bends flexible display 199. For example, the motors can move clamps 105 towards the center of apparatus 100 when test column 110 bends flexible display 199, thus creating a radius that is more true to the radius of test column 110.

Figure 3:
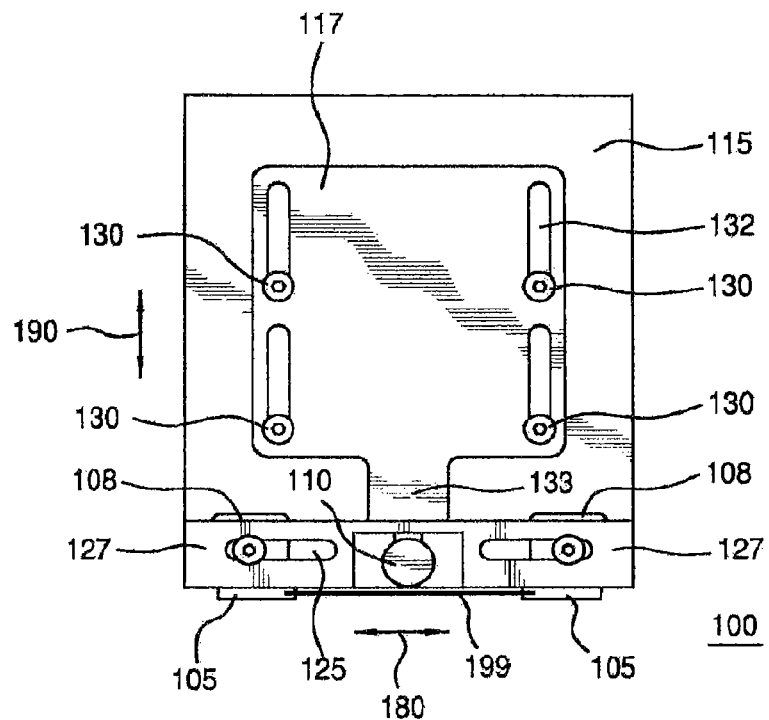
FIG. 3 illustrates a top view of an example of the display bender apparatus of FIG. 1 in an original position, according to the first embodiment.
Figure 4:
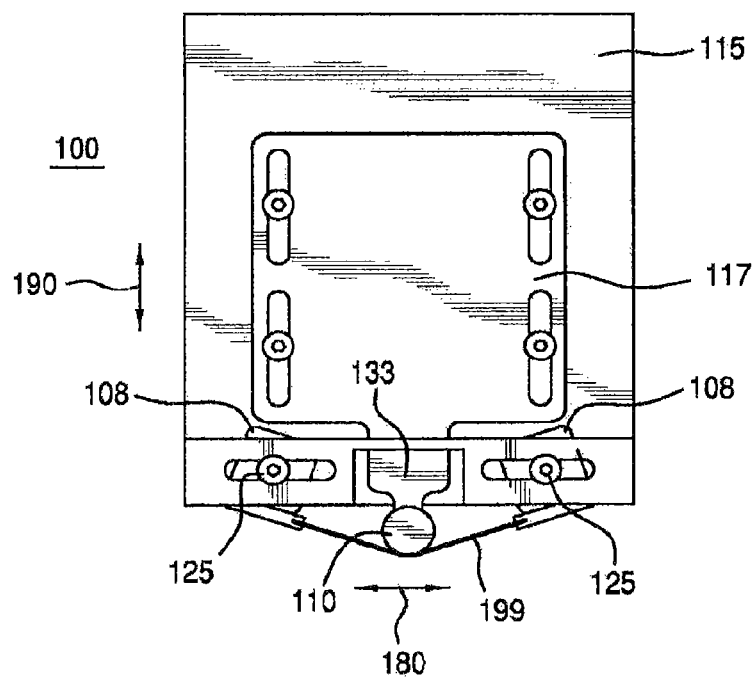
FIG. 4 illustrates a top view of an example of the display bender apparatus of FIG. 1 in a pushed position, according to the first embodiment.
Figure 5:
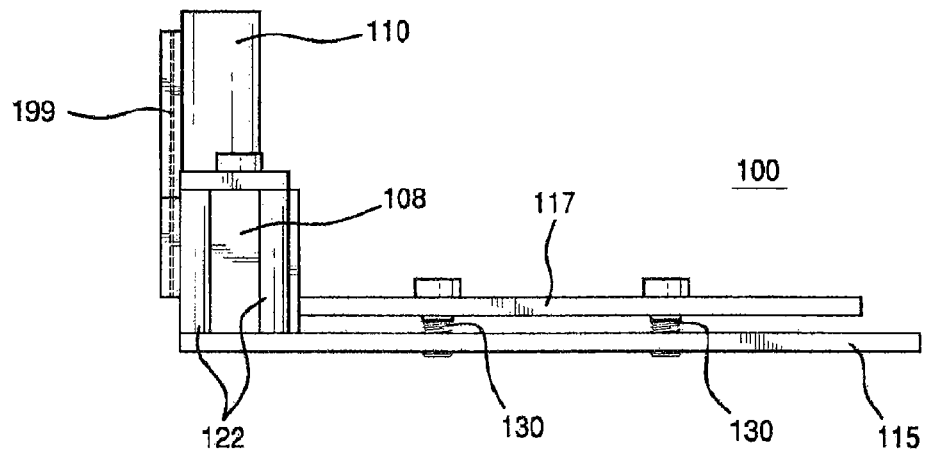
FIG. 5 illustrates a side view of an example of the display bender apparatus of FIG. 1 in an original position, according to the first embodiment.

Test column 110 can be coupled to translating stage 117. In some embodiments test column 110 is coupled to translating stage at neck 133, as seen in FIGS. 3 and 4. Translating stage 117 can be moveably coupled to base 115. In some examples, connectors 130 are used to couple translating stage 117 to base 115. As can be seen in FIGS. 3 and 5, connectors 130 pass through stage slots 132 and through base 115. Stage slots 132 are configured to allow translating stage 117 to move across base 115, thus allowing test column 110 to push and then bend flexible display 199. Translating stage 117 can be configured to move across base 115 relative to clamps 105 and pivots 108. In some examples, connectors 130 comprise a bolt with a nylon sleeve.

Figure 6:
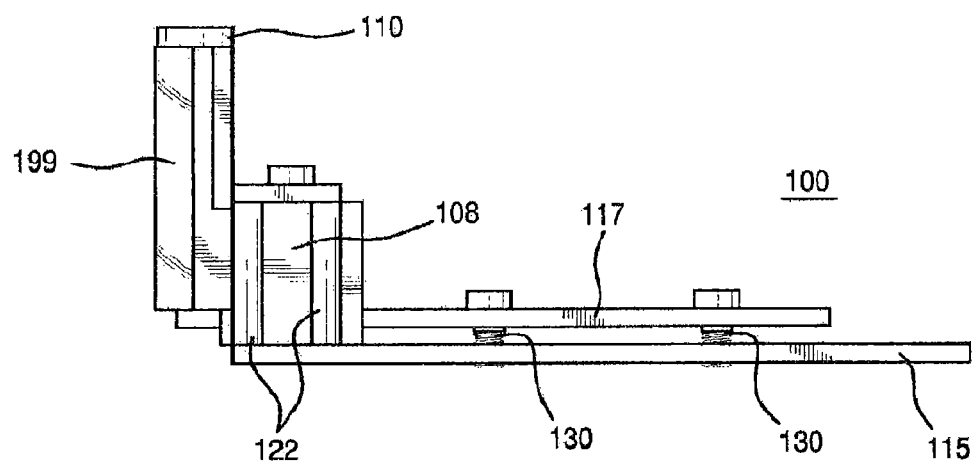
FIG. 6 illustrates a side view of an example of the display bender apparatus of FIG. 1 in a pushed position, according to the first embodiment.

In addition, apparatus 100 can also comprise a device that allows translating stage 117 to pass easily over base 115. For example, a series of ball bearings (not shown) can be positioned between translating stage 117 and base 115. Apparatus 100 may also comprise a motor (not shown) that moves translating stage 117 and, therefore, test column 110 into flexible display 199. The motor then returns translating stage 117, and, thus, test column 110 to its original position. Apparatus 100 can be seen with test column 110 and translating stage 117 in their original positions in FIGS. 1, 3, and 5, and apparatus 100 can be seen with test column 110 and translating stage 117 in the pushing position in FIGS. 2, 4, and 6.

Figure 10:
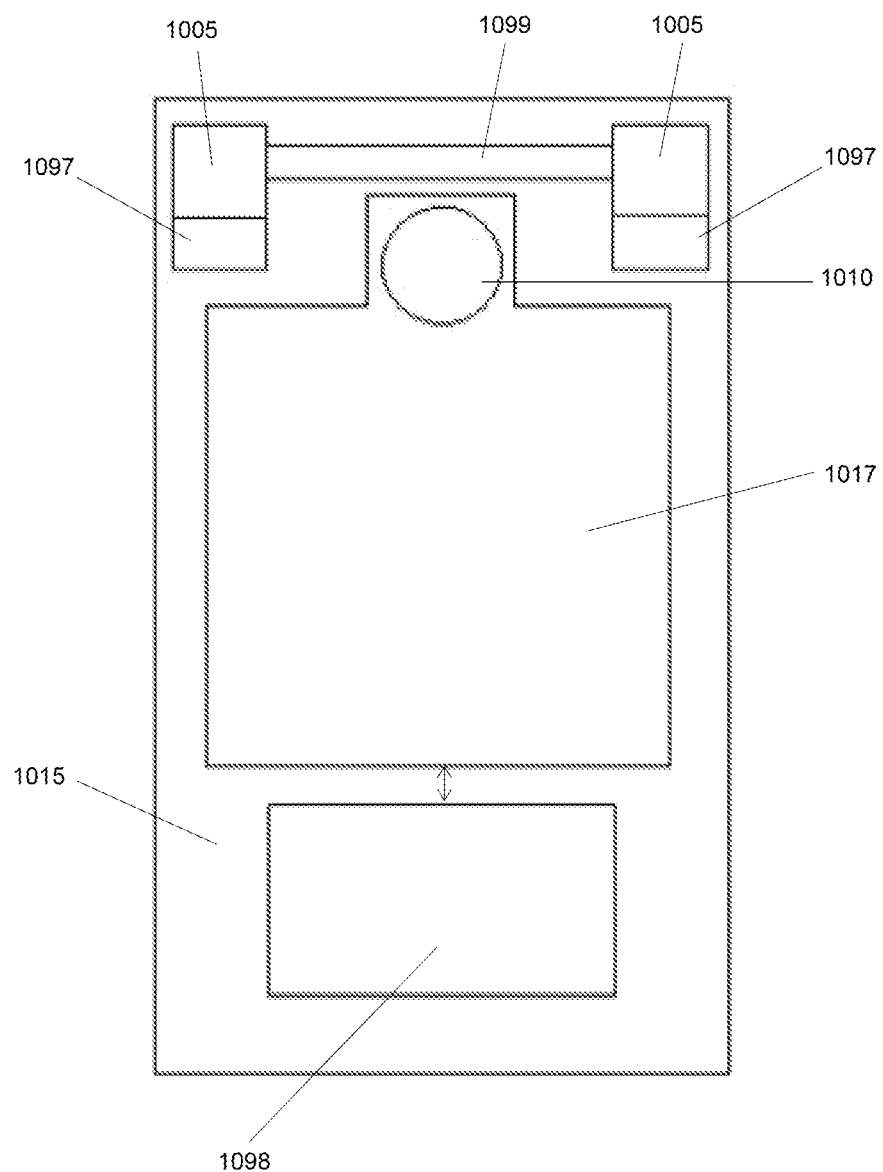
FIG. 10 illustrates a representative block diagram of a display bender apparatus, according to an embodiment.

Turning ahead briefly in the drawings, FIG. 10 illustrates a representative block diagram of display bender apparatus 1000, according to an embodiment. Display bender apparatus 1000 can be similar or identical to display bender apparatus 100 (FIGS. 1-6). For example, display bender apparatus 1000 can comprise clamps 1005 configured to couple with flexible display 1099. Further, bender apparatus 1000 can comprise base 1015, translating stage 1017, and test column 1010. In these embodiments, clamps 1005 can be similar or identical to clamps 105 (FIGS. 1-3). Further, base 1015 can be similar or identical to base 115 (FIGS. 1-6); translating stage 1017 can be similar or identical to translating stage 117 (FIGS. 1-6); and/or test column 1010 can be similar or identical to test column 110 (FIGS. 1-6). Meanwhile, display bender apparatus 1000 can comprise motor 1098 and motor(s) 1097. Motor 1098 can be similar or identical to the motor configured to move translating stage 117 (FIGS. 1-6) that is described above with respect to display bender apparatus 100 (FIGS. 1-6); and motor(s) 1097 can be similar or identical to the motor(s) configured to move clamps 105 (FIGS. 1-6) that are described above with respect to display bender apparatus 100 (FIGS. 1-6).

Figure 7:
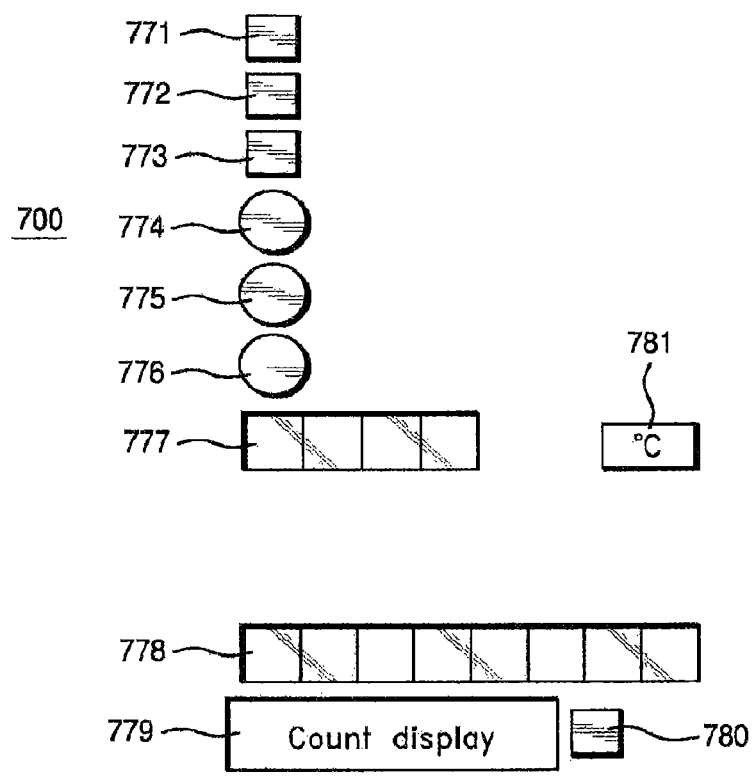
FIG. 7 illustrates an example of a user interface, according to the first embodiment.

Turning back now in the drawings, FIG. 7 illustrates an example of user interface 700, which can be displayed on a computer system (not shown) of apparatus 100 (FIGS. 1-6). User interface 700 is the portion of apparatus 100 (FIGS. 1-6) used to control the settings of apparatus 100. In addition, user interface 700 can also display current conditions of the apparatus.

User interface 700 can include a power switch 771. Power switch 771 is used to turn the power to apparatus 100 on or off. In addition, user interface 700 can include a start/stop button 772. Start/stop button 772 enables a central processing unit (CPU) of the computer system to turn on or off. As an example, the CPU can be an eight (8) bit microprocessor.

Furthermore, user interface 700 can include a cycle/hold switch 773. Cycle/hold switch 773 can be used to determine whether apparatus 100 will be used to continuously push test column 110 against flexible display 199, or whether apparatus 100 will be used to have test column 110 remain in an extended position that statically displaces flexible display 199 (the "pushed" position), without returning to the non-displacing "original" position.

If cycle/hold switch 773 is in the cycle position, cycle rate selector 774 can be used. Cycle rate selector 774 can comprise an analog knob that is used to select a cycle rate (e.g., the rate at which test column 110 and translating stage 117 cycle from the "pushed" position to the "original" position) for apparatus 100.

In addition, user interface 700 can include camera delay switch 775. Camera delay switch 775 can allow a user to choose whether there is a delay in taking pictures from a camera that can be used to monitor the bending of flexible display 199. The delay can be preset in the CPU.

If a camera is being used, whether a video camera, still camera, or motion camera user interface 700 can include brightness selector 776. Brightness selector 776 can be used by the user to select a percentage of brightness (from 0 percent (%) to 100%) of the display before the camera begins recording the bending of flexible display 199. For example, if brightness selector 776 is set at 50%, the camera will begin recording flexible display 199 when the brightness of flexible display 199 is 50% of the original brightness of flexible display 199. The CPU can utilize the actuation detector to synchronize triggering the camera to take a still picture at a consistent point in the flexible display bend cycle. For example, the CPU can trigger the camera to take a picture at every bend once an impending failure of flexible display 199 has been detected. The micro-computer system can be self calibrate to set the 100% brightness level before beginning to test the flexible display.

In some embodiments, user interface 700 can include identification display 777. Identification display 777 can include any display that will allow the user to select an identification number for the current test being run. For example, identification display 777 can include a series of thumb wheel switches numbered 0 through 9 that allows the user to rotate the switches to enter the identification number for the current test.

In addition, user interface 700 can include starting count selector 778. Starting count selector 778 allows the user to choose a number at which apparatus 100 (FIGS. 1-6) will begin counting the number of bends of flexible display 199. For example, if the user selects 1000 bends, apparatus 100 can begin counting the number of bends at 1001 bends. Furthermore, user interface 700 can include toggle switch 780, which allows the user to choose if apparatus 100 should begin counting at zero (0) or begin counting at the value defined by starting count selector 778.

User interface 700 can also include count display 779 and temperature display 781. Count display 779 shows the current number of bends in the current test done by apparatus 100. Temperature display 781 can be used to display the temperature at which the test is being run. In some examples, it may be desirable for the user to run the tests of apparatus at elevated or lowered temperatures.

Figure 8:
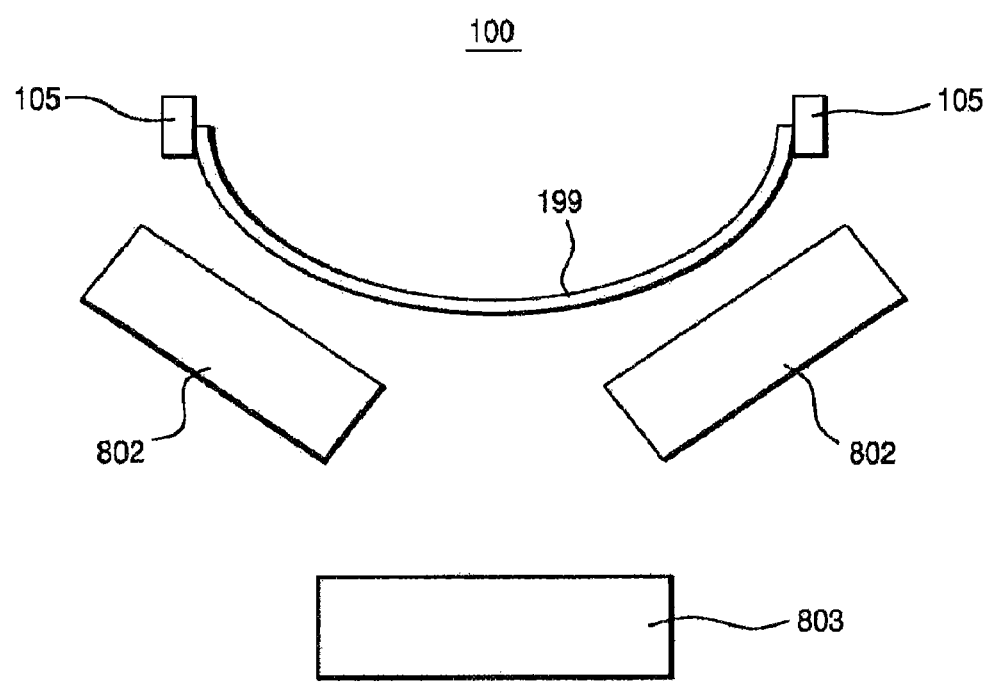
FIG. 8 illustrates an example of light detectors and a camera, according to the first embodiment.

With reference to FIG. 8, apparatus 100 can also include light detectors 802. Light detectors 802 can comprise one or more detectors that can detect light. Light detectors 802 can be used to detect the light from flexible display 199. For example, light detectors 802 can detect the brightness of an emissive flexible display or an illuminated non-emissive flexible display before any test has been run. Then, light detectors 802 can detect the change is display brightness after test column 110 has been pushed against flexible display 199. Light detection can be used to determine if flexible display 199 has failed as a result of the sequential pushing of test column 110 against flexible display 199.

In some embodiments, and as seen in FIG. 8, apparatus 100 can include 2 light detectors 802. Light detectors 802 can be set at 45 degree angles with respect to the plane of flexible display 199 when in the "original" position. Such an embodiment allows light detectors 802 to detect changes over a majority of flexible display 199 when flexible display 199 is bent.

In addition, apparatus 100 can include camera 803. Camera 803 can comprise any digital camera available, such as, for example, still camera, motion camera, or video camera. Camera 803 can be used to record the bending of flexible display 199.

Apparatus 100 can also include an actuation detector (not shown). The actuation detector can be used to detect the movement of test column 110 (FIGS. 1-6). For example, the actuation detector can comprise a photo-emitter detector component and a fin of material attached to a base of test column 110. The fin will break a beam of the emitter detector and, thus, can detect the position of test column 110 every time test column 110 contacts flexible display 199. Thus, the actuation detector can be used to count the number of times that flexible display 199 is bent by test column 110.

In some embodiments, apparatus 100 can also include a power source (not shown) for flexible display 199. The power source allows flexible display 199 to display a pattern, etc. In some examples, flexible display 199 will emit light. A light can be used because it makes it easy to determine whether flexible display 199 has failed during one of the pushes by test column 110.

In yet other embodiments, apparatus 100 can also include a display driver printed circuit board (PCB) (not shown). The display driver PCB can be coupled to flexible display 199. The display driver PCB can be used to measure the currents and/or voltages of flexible display 199. By measuring the currents and/or voltages of flexible display 199, the display driver PCB can help determine if flexible display 199 has failed during one of the test pushes of test column 110. For example, if a short develops in flexible display 199, the PCB can detect a change in the current of flexible display 199.

As previously disclosed, apparatus 100 can also include a CPU in a computer system. The CPU can be used to control apparatus 100. For example, the CPU can be set with the cycle rate, displacement stroke for test column 110, the camera trigger delay, determine whether flexible display 199 has failed, receive signals from the actuation detector to count the number of bends, receive signals from and operate light detector 802, operate camera 803, send control signals to the motor that controls translating stage 117 (FIGS. 1-6), control the displays of user interface 700 (FIG. 7), etc. Apparatus 100 can also include a memory in the computer system to store settings and instructions for various devices under control by the CPU. As an example, the memory can be a programmable memory. In some examples, the memory is an electrically erasable programmable read-only memory (EEPROM). In addition, apparatus 100 can include a power supply for the CPU.

Figure 9:
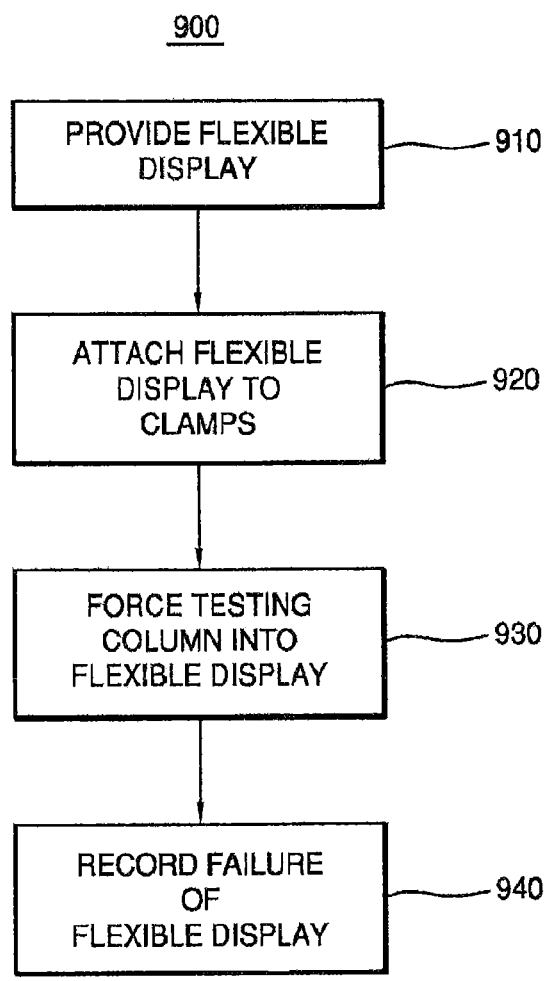
FIG. 9 illustrates a flow chart of a procedure of testing a flexible display, according to the first embodiment.

FIG. 9 illustrates an example of a method 900 of testing a flexible display. Method 900 is merely exemplary and is not limited to the embodiments presented herein. Method 900 can be employed in many different embodiments or examples not specifically depicted or described herein.

Method 900 of FIG. 9 includes a procedure 910 of providing a flexible display. As an example, the flexible display can be the same as or similar to flexible display 199 (FIGS. 1-6 and 8). In some examples, the flexible display can be a light emitting type of display, such as, for example an organic light-emitting diode (OLED). In other example, the flexible display can be a non-emitting type of display, such as, for example, an electrochromic or electrophoretic display.

Next, method 900 of FIG. 9 includes a procedure 920 of attaching the flexible display to clamps. As an example, the clamps can be that same as or similar to clamps 105 of apparatus 100 (FIGS. 1-6 and 8).

Subsequently, method 900 of FIG. 9 includes a procedure 930 of forcing a test column into the flexible display. As an example, the test column can be the same as or similar to test column 110 of apparatus 100 (FIGS. 1-6). The test column can have a fixed diameter to assist in the modeling of the material deformation. While the test column has a fixed diameter, the apparatus enables quick changes to other test columns. This enables testing display deformation for a range of bend radii. In addition, a motor can be used to force the test column into the flexible display. In some examples, the test column is continuously forced into the flexible display and the number of repetitions is recorded. In other examples, the test column is forced to push the flexible display, and the flexible display is held in the "pushed" position for a predetermined period of time. In some examples, the duration of the constant force of the push of the test column against the flexible display and/or the speed at which the constant force of the push is reached or released can be adjusted.

Next, method 900 of FIG. 9 includes a procedure 940 of recording a failure of the flexible display. As an example, a failure can occur in the flexible display when the brightness of the display hits a predetermined percentage of the original brightness of the display. For example, if the display is a light emitting type of display, suitable failure mode detectors include light meter circuits. Alternatively, failure detection can be accomplished with cameras with subsequent image processing. Some systems can use changes in current of the flexible display or changes in a signal from light detectors to assess impending failure of the flexible display, and then record the failure with one or more cameras. On the other hand, if the display is a non-emitting type of display, the failure detection can include the process of updating the display and evaluating reflected light or images of the flexible display to look for areas that failed to change. In other examples, a failure can occur when there is a current or voltage changes in the flexible display.

In one example, the flexible display can start with a full white field, and a white state baseline measurement can be taken. Then, the flexible display can be updated to a black field, and a dark state baseline measurement can be taken. Then, as the flexible display cycles between being bent and being straightened, it could also alternate between the black and white states with each bend cycle (e.g., one bend in the white state, the next bend in the dark state). Subsequent measurements of flexible display contrast would diminish as pixels were unable to switch states, such as, for example, switching from the dark state to the white state, or switching from the white state to the dark state. Similarly, subsequent measurements of the black field would increase as pixels were left stuck in the white state. In another example, an emissive flexible display can start with a fully lit "white" field and a white state baseline measurement is taken. Emissive flexible displays need not be updated with content as they are cycled, as pixels will exhibit changes if they begin to fail. The control system can monitor the brightness of the flexible display while it is being tested. Pixels may increase in brightness or decrease in brightness depending on the underlying failure mechanism.

After a failure is recorded, a number of different measurements can be taken for testing purposes. For example, the number of bends, the length of the strikes of the test column, the temperature, the length of time that each bend was held, cycle rate, etc.

Although the invention has been described with reference to specific embodiments, it will be understood by those skilled in the art that various changes can be made without departing from the spirit or scope of the invention. Accordingly, the disclosure of embodiments is intended to be illustrative of the scope of the invention and is not intended to be limiting. It is intended that the scope of the invention shall be limited only to the extent required by the appended claims. To one of ordinary skill in the art, it will be readily apparent that the semiconductor device and its methods of providing the semiconductor device discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An apparatus for testing a flexible display, the apparatus comprising:
   a first clamp configured to receive a first end of the flexible display;
   a second clamp configured to receive a second end of the flexible display, wherein the second end of the flexible display is opposite the first end of the flexible display; and
   a test column having a curved test surface being at least part of a curved exterior surface of the test column, the curved test surface having a predefined radius and being configured to interact with a display surface of the flexible display by pushing the display surface.

2. The apparatus of claim 1, further comprising:
   a translating stage coupled to the test column.

3. The apparatus of claim 2, further comprising:
   a motor coupled to the translating stage, wherein the motor moves the translating stage relative to the first and second clamps and first and second pivots.

4. The apparatus of claim 1, further comprising:
   at least two rigid supports;
   a first spring coupled to a first one of the at least two rigid supports and the first clamp; and
   a second spring coupled to a second one of the at least two rigid supports and the second clamp.

5. The apparatus of claim 1, further comprising:
   a first pivot coupled to the first clamp; and
   a second pivot coupled to the second clamp.

6. The apparatus of claim 5, further comprising:
   a first pivot slot, wherein the first pivot is coupled to the first pivot slot so that the first pivot can rotate and slide; and
   a second pivot slot, wherein the second pivot is coupled it the second pivot slot so that the second pivot can rotate and slide.

7. The apparatus of claim 5, wherein:
   the first clamp, the second clamp, the first pivot, and the second pivot lie in a plane of the flexible display when the flexible display is attached to the first and second clamps.

8. The apparatus of claim 1, further comprising at least one of:
   at least one light detector, an actuation detector, a still camera, a motion camera, or a video camera.

9. An apparatus for testing a flexible display, the apparatus comprising:
   a translating stage;
   a test column coupled to the translating stage, the test column comprising a curved test surface being at least part of a curved exterior surface of the test column, and the curved test surface comprising a predefined radius and being configured to interact with a display surface of the flexible display by pushing and directly contacting the display surface;
   a base coupled to the translating stage, wherein the translating stage is capable of moving back and forth relative to the base;
   a first clamp capable of rotating about a first axis relative to the base; and
   a second clamp capable of rotating about a second axis relative to the base;
   wherein the first clamp is configured to receive a first end of the flexible display, the second clamp is configured to receive a second end of the flexible display, and the second end of the flexible display is opposite the first end of the flexible display.

10. The apparatus of claim 9, further comprising:
a motor coupled to the translating stage.

11. The apparatus of claim 9, wherein:
the first axis and the second axis lie within a plane of the flexible display when the flexible display is attached to the first clamp and the second clamp.

12. The apparatus of claim 9, further comprising:
a first pivot slot capable of receiving the first clamp; and
a second pivot slot capable of receiving the second clamp.

13. The apparatus of claim 12, further comprising at least one of:
(a) a first rigid support coupled to the base, a second rigid support coupled to the base, a first spring coupled to the first clamp and the first rigid support, and a second spring coupled to the second clamp and the second rigid support; or
(b) at least one clamp motor coupled to the first clamp and the second clamp, wherein the at least one clamp motor moves the first clamp within the first pivot slot, and moves the second clamp within the second pivot slot.

14. A method of testing a flexible display, the method comprising:
providing a flexible display;
coupling a first end of the flexible display to a first clamp;
coupling a second end of the flexible display to a second clamp; and
pushing a curved test surface of a test column against a first surface of the flexible display, the curved test surface being at least part of a curved exterior surface of the test column and comprising a predefined radius.

15. The method of claim 14, further comprising:
detecting a light from the flexible display.

16. The method of claim 15, further comprising:
undoing the pushing of the curved test surface of the test column against the first surface of the flexible display after detecting the light.

17. The method of claim 16, further comprising at least one of:
repeating of the pushing and the undoing of the pushing of the curved test surface of the test column against the first surface of the flexible display for a predetermined number of iterations; or
repeating of the pushing and the undoing of the pushing of the curved test surface of the test column against the first surface of the flexible display until the flexible display fails.

18. The method of claim 17, further comprising:
counting a number of repetitions of the pushing and the undoing of the pushing of the curved test surface of the test column against the first surface of the flexible display.

19. The apparatus of claim 1, wherein:
the test column comprises half of a right angle cylinder, the curved exterior surface of the test column comprising a semicircular exterior surface of the half of the right angle cylinder.

20. The method of claim 14, wherein:
the test column comprises half of a right angle cylinder, the curved exterior surface of the test column comprising a semicircular exterior surface of the half of the right angle cylinder.

* * * * *